US007936143B2

(12) United States Patent
Ikeguchi et al.

(10) Patent No.: US 7,936,143 B2
(45) Date of Patent: May 3, 2011

(54) DEVICE FOR PREVENTING SWAY OF SUSPENDED LOAD

(75) Inventors: Masao Ikeguchi, Fukuoka (JP); Naotake Shibata, Fukuoka (JP); Hajime Hasegawa, Fukuoka (JP)

(73) Assignee: Kabushiki Kaisha Yaskawa Denki, Kitakyushu-shi, Fukuoka (JP)

( * ) Notice: Subject to any disclaimer, the term of this patent is extended or adjusted under 35 U.S.C. 154(b) by 421 days.

(21) Appl. No.: 12/279,454

(22) PCT Filed: Feb. 5, 2007

(86) PCT No.: PCT/JP2007/051938

§ 371 (c)(1), (2), (4) Date: Nov. 3, 2008

(87) PCT Pub. No.: WO2007/094190

PCT Pub. Date: Aug. 23, 2007

(65) Prior Publication Data

US 2009/0218305 A1 Sep. 3, 2009

(30) Foreign Application Priority Data

Feb. 15, 2006 (JP) ................................ 2006-038306

(51) Int. Cl.
*G05B 5/01* (2006.01)

(52) U.S. Cl. ........ 318/611; 318/566; 318/440; 318/443; 37/396; 37/401; 212/272; 212/275

(58) Field of Classification Search .................. 318/566, 318/611, 440, 443; 37/396, 401; 212/272, 212/275

See application file for complete search history.

(56) References Cited

U.S. PATENT DOCUMENTS 3,934,126 A * 1/1976 Zalesov et al. .................. 701/50

(Continued)

FOREIGN PATENT DOCUMENTS

JP 2001-048467 A 2/2001

(Continued)

OTHER PUBLICATIONS

International Search Report issued Apr. 10, 2007 in corresponding International Application No. PCT/JP2007/051938.

*Primary Examiner* — Paul Ip

(74) *Attorney, Agent, or Firm* — Westerman, Hattori, Daniels & Adrian, LLP

(57) ABSTRACT

This invention provides a device for preventing sway of a suspended load, which does not require complex calculation for eliminating frictional resistance components. The device is equipped with a speed control device (14) for outputting a torque command based on a speed command, a torque command filter (16), and a load torque observer (4) for estimating the load torque, and configured to output a value obtained by adding a load torque estimation signal to an output of the torque command filter (16). The device is further equipped with a high-pass filter (32) for outputting a signal $T_{RFL}$HPF in which a frictional resistance component is eliminated from the load torque estimation signal and a sway angle calculator (33) for outputting a sway angle estimation calculated value θe obtained by multiplying a sway angle calculator factor by the output signal $T_{RFL}$HPF. A value obtained by subtracting a damping compensation signal $N_{RFDP}$ obtained by damping-compensating the sway angle estimation calculated value θe from a speed command created by a speed pattern creation circuit (11) is inputted to the speed control device (14).

4 Claims, 5 Drawing Sheets

U.S. PATENT DOCUMENTS

| | | | | |
|---|---|---|---|---|
| 4,178,591 | A * | 12/1979 | Geppert | 340/685 |
| 4,216,868 | A * | 8/1980 | Geppert | 212/278 |
| 4,752,012 | A * | 6/1988 | Juergens | 212/278 |
| 5,495,955 | A | 3/1996 | Shibata | |
| 5,526,946 | A * | 6/1996 | Overton | 212/275 |
| 5,729,453 | A * | 3/1998 | Lee et al. | 701/50 |
| 5,785,191 | A * | 7/1998 | Feddema et al. | 212/275 |
| 5,938,052 | A * | 8/1999 | Miyano et al. | 212/275 |
| 5,961,563 | A * | 10/1999 | Overton | 701/50 |
| 6,170,681 | B1 * | 1/2001 | Yoshimatsu | 212/278 |
| 6,588,610 | B2 * | 7/2003 | Ong et al. | 212/275 |
| 7,367,464 | B1 * | 5/2008 | Agostini et al. | 212/308 |
| 7,472,009 | B2 * | 12/2008 | Baldwin | 701/50 |
| 7,627,393 | B2 * | 12/2009 | Sawodny et al. | 700/228 |
| 7,845,087 | B2 * | 12/2010 | Voecks | 33/391 |
| 2002/0158036 | A1 * | 10/2002 | Ong et al. | 212/275 |
| 2004/0164041 | A1 * | 8/2004 | Sawodny et al. | 212/273 |
| 2006/0061317 | A1 | 3/2006 | Shibata et al. | |
| 2007/0033817 | A1 * | 2/2007 | Voecks | 33/345 |
| 2008/0271329 | A1 * | 11/2008 | Voecks | 33/345 |
| 2010/0012611 | A1 * | 1/2010 | Sawodny et al. | 212/273 |
| 2010/0223008 | A1 * | 9/2010 | Dunbabin et al. | 701/301 |
| 2010/0283675 | A1 * | 11/2010 | Mcaree et al. | 342/357.28 |

FOREIGN PATENT DOCUMENTS

| | | | |
|---|---|---|---|
| JP | 2004-187380 | A | 7/2004 |
| WO | 93-08115 | A1 | 4/1993 |

* cited by examiner

DEVICE FOR PREVENTING SWAY OF SUSPENDED LOAD

TECHNICAL FIELD

The present invention relates to a device for preventing sway of a suspended load, which controls sway of a load during a traverse operation of, e.g., an unloader or a crane for carrying raw materials out of, for example, a ship docked at a pier carrying e.g., iron ores or coals.

BACKGROUND TECHNIQUE

As a conventional sway prevention control technology for a suspended load, for example, the "sway angle damping control method" as described in Patent Document 1 is known.

FIG. 8 is a block diagram of a travel motion drive control device 220 described in Patent Document 1.

A speed command signal from a speed commander 221 is inputted to a linear commander 222 and a lamp-like speed command $N_{RF0}$ is obtained. Either an actually measured sway angle θ detected by a rope sway angle detector 229 or a sway angle Eθ calculated by a rope sway angle calculator 238 is selected by a selector switch 239. Now, using the sway angle Eθ calculated by the rope sway angle calculator 238, a damping compensation signal $N_{RFDP}$ can be represented as follows:

$$N_{RFDP}=\text{Sway angle calculated value } E\theta\times 2\delta g/(\omega_e V_R),$$

where

"δ" is a damping factor,

"g" is gravitational acceleration (9.8 $m/s^2$),

"$V_R$" is a trolley carriage speed (m/s) corresponding to a motor rated speed,

"$\omega_e$" is a rope sway frequency, $\omega e=(g/Le)^{1/2}$ (rad/s), and

"Le" is a measured length (m) of the wound rope.

By subtracting the damping compensation signal $N_{RFDP}$ obtained as mentioned above from the aforementioned speed command $N_{RF0}$, a speed command signal $N_{RF1}$ can be obtained. Thus, the difference between the obtained speed command signal $N_{RF1}$ and the speed feedback signal $N_{MFB}$ detected by the speed detector 226 is inputted to the speed control device 223 equipped with an integrator having proportional gain A and time constant $\tau_{1s}$ to be amplified to thereby output a torque command signal $T_{RF}$.

Furthermore, a speed command signal $T_{RF}$ is inputted to an electric motor torque control device 224 that controls an electric motor torque with the first-order lag time constant $\tau_T$ to control the torque $T_M$ of the driving electric motor to thereby control the speed of the driving electric motor.

The speed feedback signal $N_{MFB}$ is created from the rotation speed $N_M$ of the electric motor via the first-order lag element 226. The reference numeral "225" denotes a block showing the mechanical time constant $\tau_M$ of the driving electric motor, and "$N_M$" denotes a speed (p.u) of the electric motor. "227" denotes a block showing a movement model of a sway angle of a rope, and "228" denotes a block showing a model of a load torque $T_L$ (p.u) of the electric motor. The speed feedback signal $N_{MFB}$ from the first-order lag element 226, the torque command signal $T_{RF}$, and a hoisting load-weight measured value $m_{LE}$ are inputted to the rope sway angle calculator 238, and the sway angle Eθ is calculated using the formula shown in Patent Document 1.

As explained above, for example, in container cranes, sway prevention is realized by performing the speed control using a value, as a new speed command $N_{RF1}$, obtained by subtracting a value obtained by multiplying $2\delta g/(\omega_e V_R)$ [where, "δ" is a damping factor, "g" is gravitational acceleration (9.8 $m/s^2$), "$\omega_e$" is a rope sway frequency (rad/s): $\omega_e=(g/Le)^{1/2}$, "Le" is a measured length of the wound rope (m), and "$V_R$" is a trolley carriage speed corresponding to a motor rated speed (m/s)] by a rope sway angle detection signal or a signal obtained by the rope sway angle estimation calculation from the speed command $N_{RF0}$ passed through a linear commander 222.

In an unloader or an overhead crane, however, it was generally difficult to mount a sway angle detector 229 thereon due to the structure thereof.

Furthermore, in calculating the rope sway angle, the calculation was complicated and cumbersome since, for example, the weight and the frictional coefficient of the trolley carriage or the suspended load were needed for the calculation to eliminate the frictional resistance component.

Further, the measurement of the length of the wound rope $L_e$ was needed to obtain the angular frequency $\omega_e$, which also makes the calculations cumbersome.

Given the situation above, a simple and easily adjustable sway prevention control method with less measurement items was desired for unloaders and certain overhead cranes with nearly same operational patterns and almost no suspended load weight changes.

[Patent Document 1] U.S. Pat. No. 5,495,955

[Patent Document 2] Japanese Patent No. 3,173,007

[Patent Document 3] Japanese Unexamined Laid-open Patent Publication No. 2004-187380, A

DISCLOSURE OF THE INVENTION

Problems to be Solved by the Invention

The present invention was made to solve the aforementioned problems, and aims to provide an device for preventing sway of a suspended load capable of, in unloaders or certain overhead cranes with almost no suspended load weight changes, realizing control equivalent to conventional control without the need of complex calculations for eliminating frictional resistance components, without the need of estimation calculations of a sway angle θe, without the need of calculations of the sway frequency ωe, thereby eliminating measurement of the wound lope length $l_e$, enabling a control effect equivalent to that of a sway angle damping control method, and making the setup of the control very easy.

Means for Solving the Problems

To solve the aforementioned problem, according to the invention of a device for preventing sway of a suspended load as recited in claim 1, a device for preventing sway of a suspended load for a trolley carriage is equipped with a hoisting motor for hoisting a rope having one end to which a bucket is attached and a driving motor, and the device comprises a speed pattern creation circuit for creating a speed command, a speed control device for outputting a torque command based on the speed command, a torque command filter for outputting a torque command by a first-order lag circuit by inputting the torque command, a load torque observer for estimating and outputting a load torque on the trolley carriage by inputting the torque command which is an output of the speed control device, the device being configured to output a value obtained by adding a load torque estimation signal which is an output of the load torque observer to an output of the torque command filter, characterized in that the device is further equipped with a high-pass filter (32) for outputting a signal $T_{RFL}$HPF obtained by eliminating a fixed or low frequency component corresponding to frictional resistance from the load torque estimation signal, and a sway angle calculator for outputting a sway angle estimation calculated value θe obtained by multiplying a sway angle calculator factor by an output signal $T_{RFL}$HPF from the high-pass filter, wherein a value obtained by subtracting a damping compensation signal $N_{RFDP}$ obtained by damping-compensating the sway angle estimation calculated value θe from a speed command created by the speed pattern creation circuit is inputted to the speed control device.

According to the invention as recited in claim 2, in the device for preventing sway of a suspended load as recited in claim 1, the sway angle calculator factor of the sway angle calculator is represented by $F_R/(M_B g)$, where "$F_R$" is a rated load, "$M_B$" is a suspended load weight, and "g" is gravitational acceleration (9.8 $m/s^2$).

According to the invention as recited in claim 3, in the device for preventing sway of a suspended load as recited in claim 1, the damping compensation signal $N_{RFDP}$ is represented by $$N_{RFDP} = \text{Sway angle calculation value } \theta e \times 2\delta g/(\omega_e V_R)$$

where

"δ" is a damping factor,

"g" is gravitational acceleration (9.8 $m/s^2$), $V_R$ is a trolley carriage speed (m/s) corresponding to the motor rated speed (m/s), ωe is a rope sway frequency (rad/s), $\omega e = (g/le)^{1/2}$, and le is a measured length of the hoisted rope (m).

According to the invention of the device for preventing sway of a suspended load as recited in claim 4, a device for preventing sway of a suspended load for a trolley carriage is equipped with a hoisting motor for hoisting a rope having one end to which a bucket is attached and a driving motor, and the device comprises a speed pattern creation circuit for creating a speed command, a speed control device for outputting a torque command based on the speed command, a torque command filter for outputting a torque command by a first-order lag circuit by inputting the torque command, a load torque observer for estimating and outputting a load torque on the trolley carriage by inputting the torque command which is an output of the speed control device, the device being configured to output a value obtained by adding a load torque estimation signal which is an output of the load torque observer to an output of the torque command filter, characterized in that the device is equipped with a high-pass filter for outputting a signal $T_{RFL}$HPF obtained by eliminating a fixed or low frequency component corresponding to frictional resistance from the load torque estimation signal, and configured to input a value obtained by subtracting a damping compensation signal created by multiplying a damping compensation gain $G_{DP}$ determined by each region of a speed pattern of the speed command created by the speed pattern creation circuit by an output signal $T_{RFL}$HPF from the high-pass filter from a speed command $N_{RF0}$ created by the speed pattern creation circuit.

Effects of the Invention

According to the invention as recited in claims 1 to 3, control equivalent to control by an existing technology can be achieved with a new control device based on the sway angle damping control technology disclosed in Patent Document 1, without the need of complex calculations for eliminating a frictional resistance component in calculating a sway angle θe from a load torque.

Furthermore, according to the invention as recited in claim 4, a control effect equivalent to that of a sway angle damping control method can be obtained and the setup for the control can be performed very easily by determining damping compensation gain $G_{DP}$ according to an operation pattern to perform sway prevention control, without the need for calculating an estimate sway angle θe, a sway frequency $\omega e = (g/le)^{1/2}$, and therefore without the need for measuring a the hoisted rope length le.

DESCRIPTIONS OF THE REFERENCE NUMERALS

Figure 1:
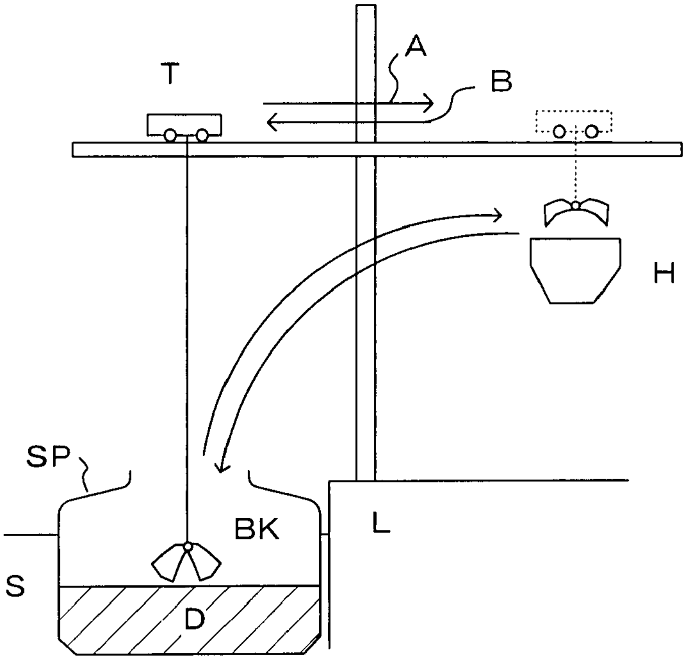
FIG. 1 is a schematic view of an example of an unloader according to the present invention.

1 Controller for sway prevention control
2 Movement mode of a suspended load
3 Trolley carriage load torque model
4 Load torque observer
11 Speed pattern creation circuit
12 Speed command $N_{RF0}$ (p. u) created from the speed pattern creation circuit
13 Speed command $N_{RF1}$ (p. u) coupled with a sway prevention damping compensation signal
14 IP or PI controlled speed control circuit
15 Torque command $T_{RF0}$ (p. u) created by the speed control circuit
16 Torque command filter by a first-order lag circuit
17 Torque command $T_{RF1}$ (p. u) after the torque command filter
18 Inertia of the motor+the trolley carriage
19 Speed feedback signal $N_{FB}$ (p. u)
20 Sway angle θ (rad)
21 Load torque $T_L$ (p. u)
31 Load torque estimation signal $T_{RFL}$ (p. u)
32 First-order or second-order high-pass filter
33 Sway angle calculator
34 Sway angle estimation calculated value θe (rad)
35 Damping compensation gain $G_{DP}$
36 Damping compensation signal $N_{RFDP}$ (p. u)
A Direction headed to the land
B Direction headed to the sea
BK Bucket
D Raw material
H Hopper
L Land
S Sea
SP Ship
T Trolley carriage
le Measured value of a wound rope length
$M_B$ Hoisted mass Pm Suspended load position
Pt Trolley carriage position
$N_{RF}$ Speed command

BEST MODE FOR CARRYING OUT THE INVENTION

Hereinafter, the invention will be explained by way of an example of an unloader with reference to the drawings.

Embodiment 1

FIG. 1 is a schematic view of an unloader as an example of the present invention.

In FIG. 1, "T" denotes a trolley carriage, "A" denotes a direction headed to the land, "B" denotes a direction headed to the sea, "H" denotes a hopper, "SP" denotes a ship, "BK" denotes a bucket, "S" denotes the sea, "L" denotes the land, and "D" denotes raw materials.

In FIG. 1, an unloader is equipped on the land L facing the sea S, and a trolley carriage T is provided at a predetermined height above the land L in a manner such that it can horizontally move back-and-forth between the sea and the land by the internal motor.

A rope hoisting motor is attached to the trolley carriage T, and a bucket BK is attached to the one end of the rope.

After moving to the position above the ship SP alongside the land, the trolley carriage T puts down the bucket BK. After scooping the raw material D as a ship load by the bucket, the trolley carriage moves from the seal S to the land L while winding up the rope to pull up the bucket BK, moves to the position above the hopper H on the land, and then drops the raw material D in the hopper H. After that, the trolley carriage moves the bucket BK from the land L to the sea S while unwinding the rope to again scoop the raw material D in the ship SH. This process will be repeated.

In such a device, the bucket attached to the rope will sway as the trolley carriage moves.

Figure 2:
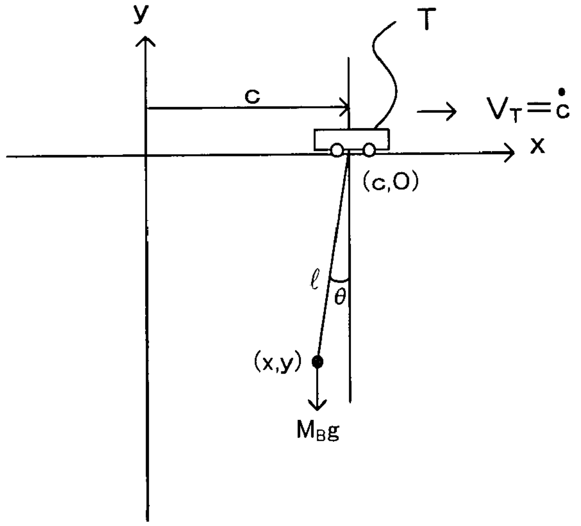
FIG. 2 is model view of a suspended load sway angle.

FIG. 2 shows a model diagram of a suspended load sway angle in this instance.

In FIG. 2, the bucket position (x, y) can be represented by $$x = c - l \sin \theta$$

$$y = -l \cos \theta$$

where the intersecting point of the crane column support of the unloader and the rail of the trolley carriage is a starting point 0, "C" denotes the present position of the trolley carriage T, "l" (m) denotes the length of the wounding rope, "θ" (rad) denotes the bucket position, and "$M_B$ (K g)" denotes the mass of the suspended load.

Figure 3:
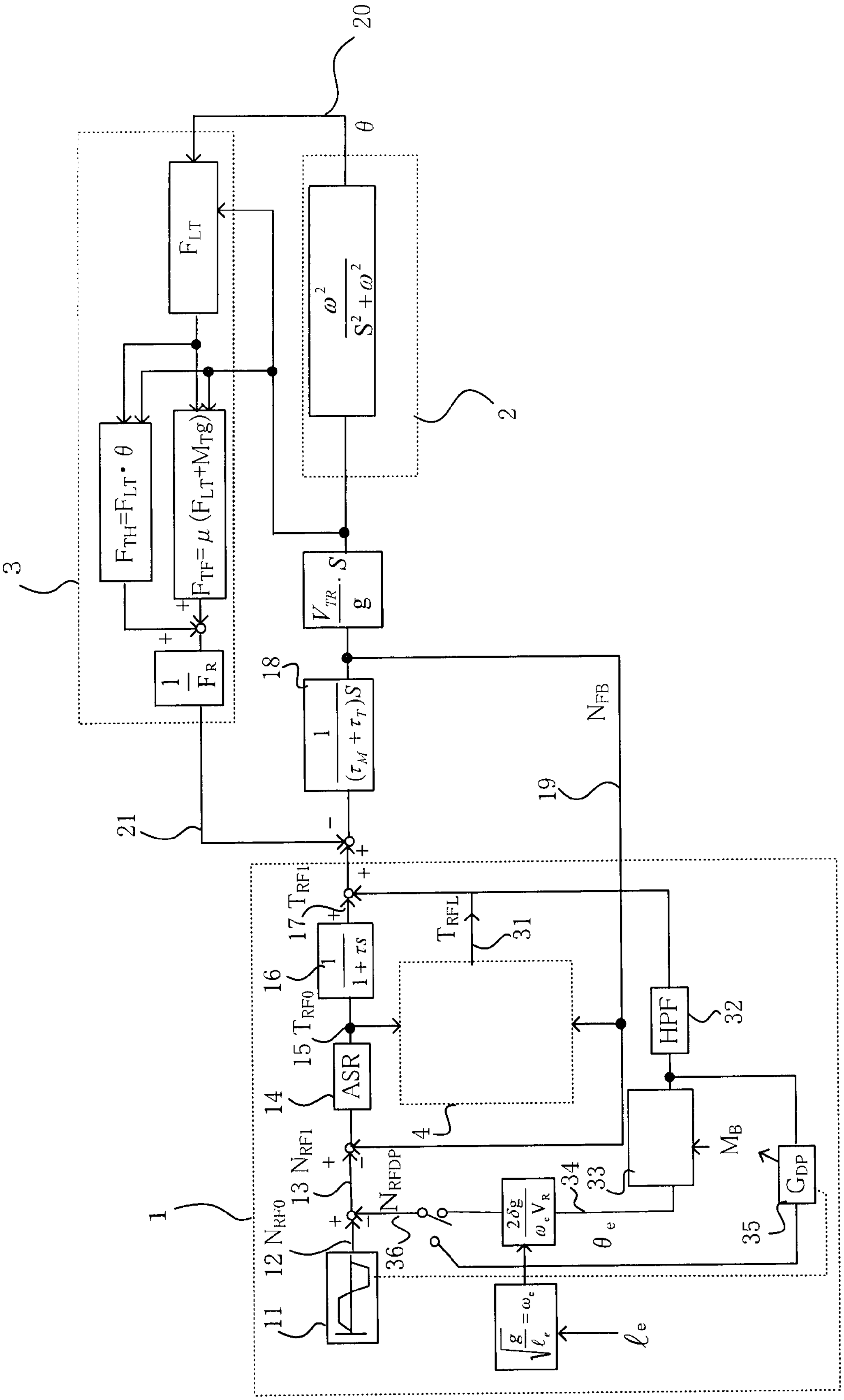
FIG. 3 is a diagram explaining the control principle of the present invention.

FIG. 3 is a diagram explaining a load torque model and a trolley carriage load torque model of the control principle of the present invention.

In FIG. 3, the reference numeral "1" denotes a controller for performing load sway prevention control according to the present invention, "2" denotes a movement mode of the suspended load, "3" denotes a trolley carriage load torque model, "4" denotes a load torque observer for estimating a load torque estimation signal $T_{RFL}$ (p. u) from a torque command $T_{RF0}$ (p. u) and a speed feedback signal $N_{FB}$ (p. u) in place of an original load torque sensor, "11" denotes a speed pattern creation circuit for creating a speed command $N_{RF0}$ (p. u), "12" denotes a speed command $N_{RF1}$ (p. u) created by the speed pattern creation circuit, "13" denotes a speed command $N_{RF1}$ (p. u) coupled with the sway prevention damping compensation signal, "14" denotes a speed control circuit that outputs a torque command $T_{RF0}$ (p. u) by way of IP or PI control based on the difference between the speed feedback signal $N_{FB}$ (p. u) from the speed command $N_{RF0}$ (p. u) created by the speed pattern creation circuit 11 and the damping compensation signal $N_{RFDP}$ (p. u) obtained by the present invention, "15" denotes a torque command $T_{RF0}$ (p. u) created by the speed control circuit, "16" is a torque command filter by a first-order lag circuit, "17" denotes a torque command $T_{RF1}$ (p. u) after the torque command filter, "18" denotes inertia of the motor plus the trolley carriage, "19" denotes a speed feedback signal $N_{FB}$ (p. u), "20" denotes a sway angle θ (rad), "21" denotes a load torque $T_L$ (p. u), "31" denotes a load torque estimation signal $T_{RFL}$ (p. u), "32" denotes a first or second high-pass filter, "33" denotes a sway angle calculator, "34" denotes a sway angle estimation calculated value θe (rad), "35" denotes a damping compensation gain $G_{DP}$, and "36" denotes a damping compensation signal $N_{RFDP}$ (p. u).

The sway motion model formula for sway of a suspended load is given by the following known Formula (1). (see 2 in FIG. 3)

$$\theta = \left(\frac{\dot{V}_T}{g}\right)\frac{\omega^2}{s^2 + \omega^2} \tag{1}$$

Next, a load model of a traverse motion of a trolley carriage carrying a suspended load will be obtained.

The tension $F_{LT}$ of the wound rope can be given by:

$$\begin{aligned} F_{LT} &= M_B g\left\{\left(\frac{\dot{V}_T}{g}\right)\sin\theta + \cos\theta + \frac{l\dot{\theta}^2}{g} - \frac{\ddot{l}}{g}\right\} \\ &\approx M_B g\left\{\left(\frac{\dot{V}_T}{g}\right)\theta + 1 + \frac{l\dot{\theta}^2}{g}\right\} \end{aligned} \tag{2}$$

Here, sin θ≈θ and cos θ≈1 because θ is small.

Also, $\ddot{l}/g$ is ignored since the acceleration of the rope length change is small.

The horizontal directional component $F_{TH}$ of $F_{LT}$ is given by:

$$F_{TH} = F_{LT} \sin \theta \approx F_{LT}\theta \tag{3}$$

The traversing frictional resistance $F_{TF}$ of the trolley carriage caused by the vertical directional component of $F_{LT}$ and the trolley carriage mass $M_T$ is given by:

$$F_{TF} = \mu(F_{LT} \cos \theta + M_T g) \approx \mu(F_{LT} + M_T g) \tag{4}$$

Therefore, when the rated load is $F_R$, the load torque $T_L$ is given by:

$$\begin{aligned} F_R T_L &= F_{TH} + F_{TF} \\ &= F_{LT}\theta + \mu(F_{LT} + M_T g) \end{aligned} \tag{5}$$

It can be understood from the Formula (5) that the load torque includes a component proportional to the sway angle θ.

Therefore, if the load torque can be detected, it is possible to handle signals that contain components proportional to the sway angle δ.

In FIG. 3, by approximating the system to an inertia model in which the motor and the trolley carriage are integrated and applying a load torque observer by a torsional vibration control device in an electric motor speed control system described in Patent Document 2 and a torsional vibration control device described in Patent Document 3, a signal $T_{RFL}$ 31 showing a detected suspended load on the trolley carriage is passed through the first or second-ordered HPF (high-pass filter) to thereby eliminate a fixed or low frequency component corresponding to the frictional resistance $F_{TF}$.

If $T_L = T_{RFL}$ in Formula 5, $$\begin{aligned} F_R T_{RFL} &= F_{TH} + F_{TF} \\ &= F_{LT}\theta + \mu(F_{LT} + M_T g) \end{aligned} \tag{6}$$

When Formula (2) is substituted into Formula (6) and organized:

$$\left(\frac{\dot{V}_T}{g}\right)\theta^2 + \left\{1 + \mu\left(\frac{\dot{V}_T}{g}\right)\right\}\theta + \mu\left(1 + \frac{M_T}{M_B}\right) - \frac{F_R T_{RFL}}{M_B g} = 0 \tag{7}$$

Here, if:

$$A = \frac{\dot{V}_T}{g}$$

$$B = 1 + \mu\left(\frac{\dot{V}_T}{g}\right)$$

$$C = \mu\left(1 + \frac{M_T}{M_B}\right) - \frac{F_R T_{RFL}}{M_B g}$$

then:

$$\theta = \frac{-B + B\sqrt{1 - 4AC/B^2}}{2A}$$

Since the facility constant of the unloader system is $1 >> 4AC/B^2$ $$\begin{aligned} \theta &\approx \frac{-B + B(1 - 2AC/B^2)}{2A} \\ &= -\frac{C}{B} \\ &= \frac{\frac{F_R T_{RFL}}{M_B g} - \mu\left(1 + \frac{M_T}{M_B}\right)}{1 + \mu\left(\frac{\dot{V}_T}{g}\right)} \end{aligned}$$

The second term of the denominator can be ignored since it is very small compared to 1.

$$\theta = \left\{\frac{F_R T_{RFL}}{M_B g} - \left(1 + \frac{M_T}{M_B}\right)\mu\right\} \tag{8}$$

If Formula (8) is transformed:

$$T_{RFL} = \left(\frac{M_B g}{F_R}\right)\theta + \frac{(M_T + M_B)g}{F_R}\mu \tag{9}$$

As explained above, since the second term of the frictional resistance component can be eliminated by passing the first-order or the second-order HPF (high-pass filter) 32, and therefore $T_{RFL}HPF$ can be given by:

$$T_{RFL}HPF = \left(\frac{M_B g}{F_R}\right)\theta \tag{10}$$

Here, $T_{RFL}HPF$ represents the signal after passing through the high-pass filter HPF.

Thus, the sway angle calculating value θe can be obtained with Formula (11):

$$\theta_e = \left(\frac{F_R}{M_B g}\right)T_{RFL}HPF \tag{11}$$

Here, $$\left(\frac{F_R}{M_B g}\right)$$

corresponds to the sway angle calculator 33.

The damping compensation signal $N_{RFDP}$ can be created by multiplying $$\left(\frac{2\delta g}{\omega_e V_R}\right)$$

by θe obtained from the new method mentioned above.

$$N_{RFDP} = \left(\frac{2\delta g}{\omega_e V_R}\right)\theta e \tag{12}$$

Sway prevention can be realized by performing the speed control with a command $N_{RF1}$ created by subtracting the above from the original speed command $N_{RFD}$, i.e., the following known Formula described in Patent Document 1 is materialized.

$$N_{RF1} = N_{FR0} - \left(\frac{2\delta g}{\omega_e V_R}\right)\theta e \tag{13}$$

where "σ" denotes a damping factor, "g" is gravitational acceleration (9.8 m/s$^2$), "$\omega_e$" denotes a sway frequency of the rope, $\omega e = \sqrt{g/le}$(rad/s), "le" denotes the measured length of the wound rope (m), "$V_R$" denotes the trolley carriage speed corresponding to Several kinds of methods are disclosed in Patent Document 1, but this means that another kind of method based on the sway angle damping control method has been added.

On the other hand, a new control method can be built using Formula (10).

That is, the damping compensation signal, i.e., $N_{RFDP} = G_{DP} \cdot T_{RFL}HPF$ created by multiplying $T_{RFL}HPF$ with the damping compensation gain $G_{DP}$ 35 determined by each region of the speed pattern, is subtracted from the signal $N_{RF0}$ created by the speed pattern creation circuit 11 to create $N_{RF1}$ 13. By executing the speed control using the command $N_{RF1}$ 13, a sway prevention control can be realized.

The validity can be shown by the following:

Since $N_{RFDP}=G_{DP}T_{RFL}HPF$, it can be shown using Formula (10):

$$N_{RFDP} = G_{DP}\left(\frac{M_B g}{F_R}\right)\theta \quad (14)$$

On the other hand, in the sway angle damping control method, as shown in the sway angle damping control method in Patent Document 1, sway prevention control is performed using the signal as $N_{RFDP}$ created by multiplying the signal from the sway angle detector or the sway angle calculated estimation value θe by a function constituted by, e.g., the damping factor δ and the sway frequency (rad/s).

In this case, the speed compensation signal $N_{RFDP}$ can be shown from Formula (12) as follows.

$$N_{RFDP} = \left(\frac{2\delta g}{\omega_e V_R}\right)\theta e$$

where $$\omega_e = \sqrt{\frac{g}{le}},$$

le=measured length of the wound rope (m)

Thus, by comparing Formula (12) and (14), where θe≈θ

$$G_{DP} = \left(\frac{2F_R}{V_R}\right)\left(\frac{\delta}{\omega_e M_B}\right) \quad (15)$$

Inside the preceding parentheses of Formula (15) is a fixed value determined by the machinery of the unloader. On the other hand, the sway angular frequency ωe and the suspended load mass $M_B$ may vary.

Also, δ is a controlling constant which is used by switching the predetermined values according to the operational pattern to provide stable sway prevention state. The value inside the following parentheses is a value which may vary during operations. However, in an unloader, the suspended load mass may vary whether it is heading to the land or the sea. The operational patterns are also mostly predetermined and there are only a few varieties.

Thus, a sway prevention control effect equivalent to that of the sway angle damping control method described in Patent Document 1 can be realized by setting the $G_{DP}$ based on the operational patterns.

By doing so, there is no need to perform the estimation calculation of the sway angle and the calculation of the sway frequency ωe, i.e., $$\omega e=\sqrt{r/le}$$

and therefore it is not required to measure the wound rope length le.

FIGS. 4 through 7 show results of the sway prevention control effects in the facility using a method incorporating a crane model by simulation.

In FIGS. 4 through 7, "A" denotes a direction headed for the land, "B" denotes a direction headed to the sea, "Pt" denotes the position of the trolley carriage, "Pm" denotes the position of the suspended load, and "$N_{RF}$" denotes the speed command.

In the outline specifications of this example, the total mass of the bucket and the raw materials was about 40 tons, the traversing speed was about 180 m/sec, and the traversing distance was about 33 m.

Figure 4:
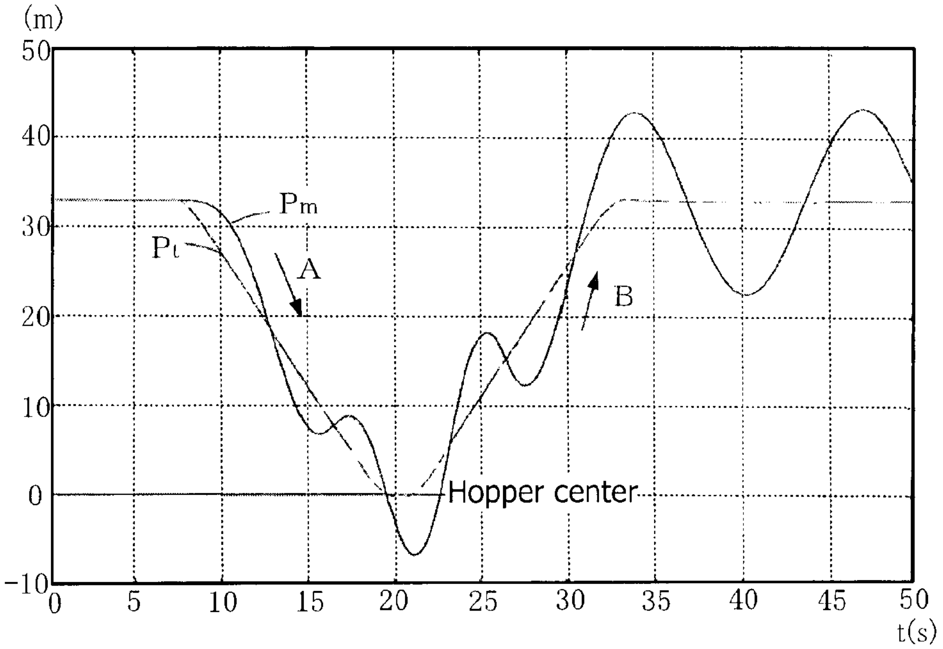
FIG. 4 shows a suspended load position simulation with no sway prevention control.

FIG. 4 is a diagram showing the relationship between the position Pt of the trolley carriage (dotted line) and the position Pm of the suspended load (solid line) when there is no sway prevention control. In the diagram, the vertical axis represents the distances (m) between the Hopper Center 0 and the trolley carriage and the suspended load, when the center position of the Hopper in FIG. 1 (Hopper Center) is 0 (the coordinate (c, o) of the trolley carriage in FIG. 2), and the positive side shows the direction from the original point to the sea, and the negative side shows the direction from the original point to the land. The horizontal axis shows the transition of time.

The diagram shows that when the trolley carriage is moving toward the hopper center on the land, the suspended load (solid line) is oscillating vertically about the trolley carriage line (dotted line) as its center, and from the amplitude of the swinging (m), the suspended load widely passes over the hopper (about 7 meters) and large residual sway (about 10 meters) continues above the ship. This condition is extremely dangerous.

Figure 5:
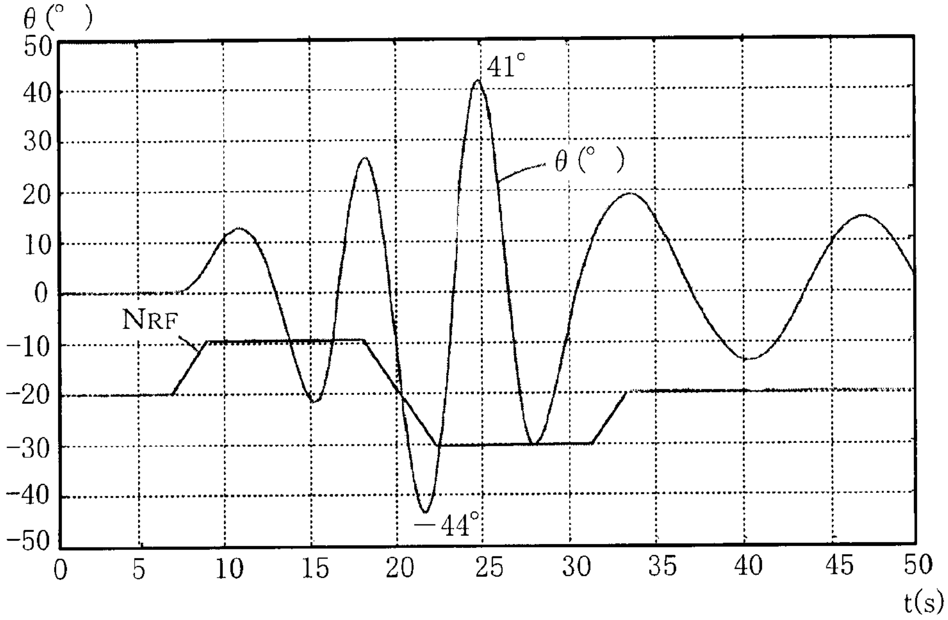
FIG. 5 shows a sway angle simulation with no sway prevention control.

FIG. 5 shows the speed command (bold line) and the sway angle θ of FIG. 2 (thin line) at that time. The vertical axis shows the angle (degrees) and the horizontal line shows the transition of time (seconds). The sway angle θ is also widely swaying (+410 to −44° at the maximum).

Figure 6:
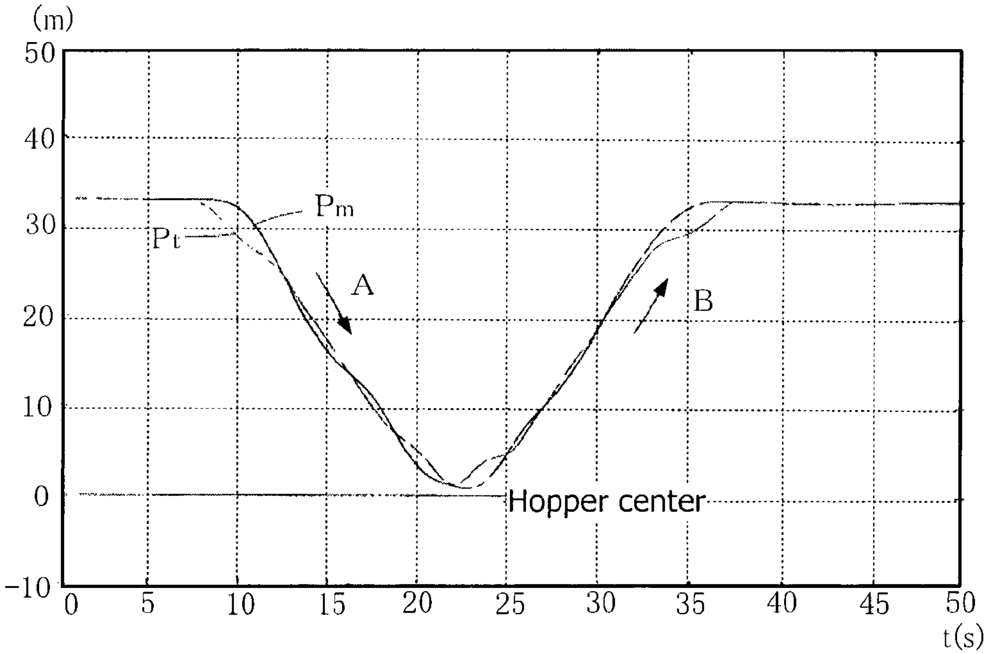
FIG. 6 shows a suspended load position simulation with sway prevention control.

On the other hand, FIG. 6 is a diagram showing the relationship between the position Pt of the trolley carriage (dotted line) and the position Pm of the suspended load (solid line) when the sway prevention control according to the present invention is implemented. In the diagram, the vertical axis shows the distances (m) between the Hopper Center 0 and the trolley carriage and the suspended load, and the positive side shows the direction from the original point to the sea, and the negative side shows the direction from the original point to the land. The horizontal axis shows the transition of time.

The diagram shows that when the trolley carriage is moving towards the hopper center on the land, the suspended load (solid line) nearly overlaps the trolley carriage line (dotted line) and the swinging is very small. This reveals that the suspended load stops above the hopper and does not pass it. And when returned to the position above the ship, the residual sway is kept at a minimum.

Figure 7:
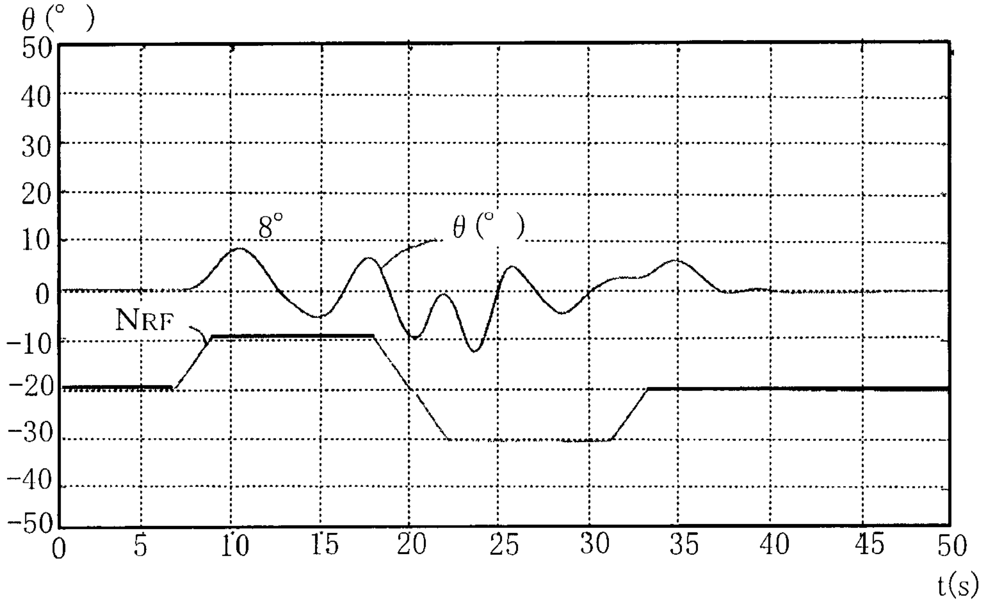
FIG. 7 shows a sway angle simulation with sway prevention control.
Figure 8:
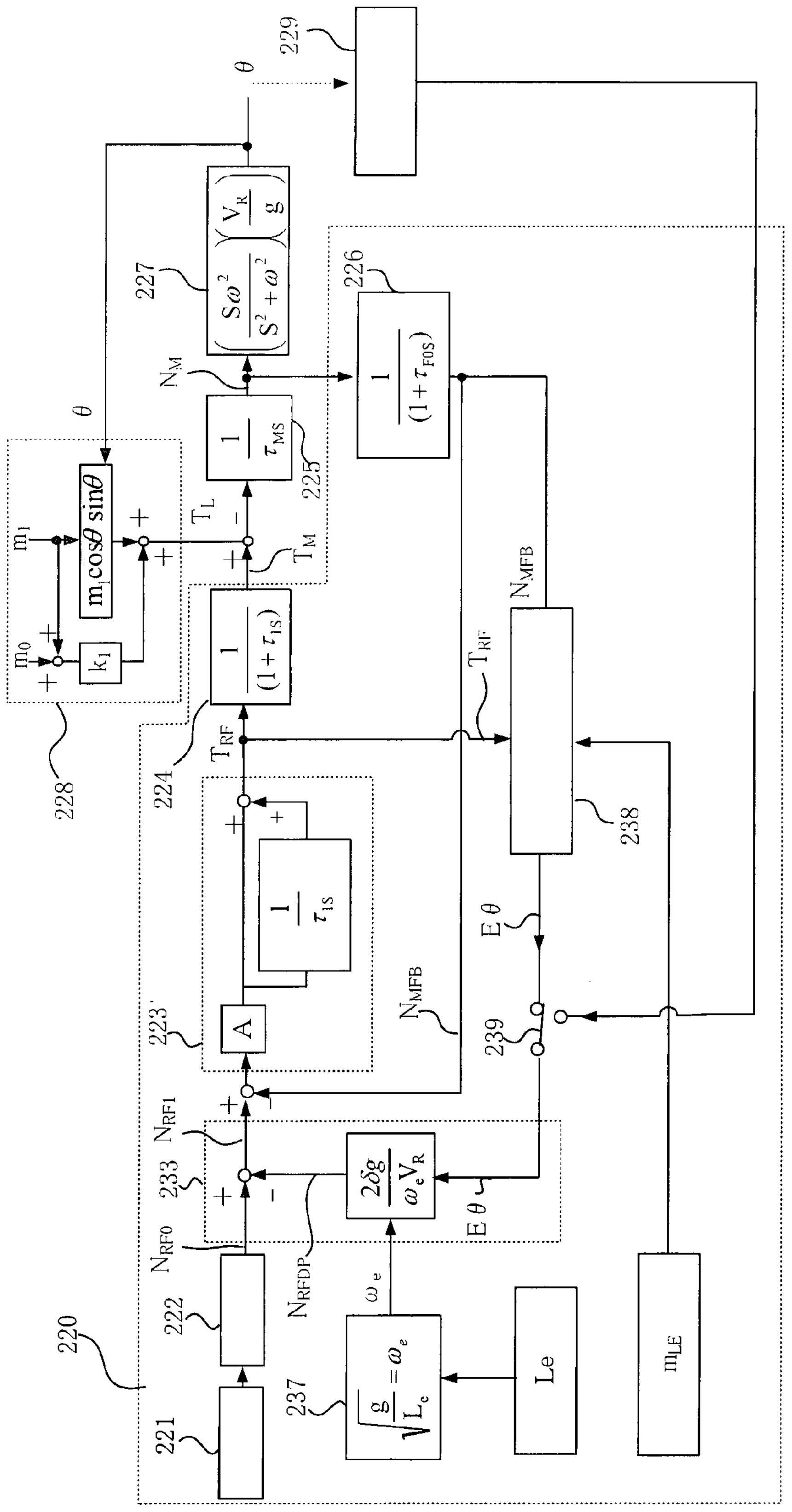
FIG. 8 is a diagram explaining the control principle described in Patent Document 1.

FIG. 7 shows the speed command (bold line) and the sway angle θ of FIG. 2 (thin line) at that time. The vertical axis shows the angle (degrees) and the horizontal line shows the transition of time (seconds). This notably reveals that the damping is very effective at the sway angle θ and the sway prevention control according to the present invention is effective.

According to the invention as recited in claims 1 to 3, sway prevention control equivalent to conventional control can be realized without the need of complex calculations for eliminating frictional resistance components when calculating the sway angle θe from the load torque as a new method in which control is executed based on the sway angle damping control method disclosed in Patent Document 1.

Further, according to the invention as recited in claim 4, there is no need to perform estimation calculation of the sway angle θe, calculation of the sway frequency ωe, $$\omega e=\sqrt{g/le}$$

, and measurement of the length le of the wound rope.

Also, by determining the damping compensation gain $G_{DP}$ based on the operational pattern and performing the sway prevention control, the control effect equivalent to that of the sway angle damping control method can be achieved, making the control setup extremely easy.

INDUSTRIAL APPLICABILITY

The device for preventing sway of a suspended load according to the present invention can be preferably applied to, for example, unloaders and overhead cranes, in which sway prevention control of a load during a traverse motion operation is required.

What is claimed is:

1. A device for preventing sway of a suspended load for a trolley carriage equipped with a hoisting motor for hoisting a rope having one end to which a bucket is attached and a driving motor, the device comprising: a speed pattern creation circuit (11) for creating a speed command, a speed control device (14) for outputting a torque command based on the speed command, a torque command filter (16) for outputting a torque command by a first-order lag circuit by inputting the torque command, a load torque observer (4) for estimating and outputting a load torque on the trolley carriage by inputting the torque command which is an output of the speed control device (14), the device being configured to output a value obtained by adding a load torque estimation signal which is an output of the load torque observer (4) to an output of the torque command filter (16), characterized in that the device is further equipped with a high-pass filter (32) for outputting a signal $T_{RFL}$HPF obtained by eliminating a fixed or a low frequency component corresponding to frictional resistance from the load torque estimation signal, and a sway angle calculator (33) for outputting a sway angle estimation calculated value θe obtained by multiplying a sway angle calculator factor by an output signal $T_{RFL}$HPF from the high-pass filter (32), wherein a value obtained by subtracting a damping compensation signal $N_{RFDP}$ obtained by damping-compensating the sway angle estimation calculated value θe from a speed command created by the speed pattern creation circuit (11) is inputted to the speed control device (14).

2. The device for preventing sway of a suspended load as recited in claim 1, wherein the sway angle calculator factor of the sway angle calculator (33) is represented by $F_R/(M_B g)$ where "$F_R$" is a rated load, "$M_B$" is a suspended load weight, and "g" is gravitational acceleration (9.8 m/s$^2$).

3. The device for preventing sway of a suspended load as recited in claim 1, wherein the damping compensation signal $N_{RFDP}$ is represented by $$N_{RFDP}=\text{Sway angle calculation value } \theta e\times 2\delta g/(\omega_e V_R)$$

where

"δ" is a damping factor,

"g" is gravitational acceleration (9.8 m/s$^2$), $V_R$ is a trolley carriage speed (m/s) corresponding to the motor rated speed (m/s), ωe is a rope sway frequency (rad/s), $\omega e=(g/le)^{1/2}$, and le is a measured length of the hoisted rope (m).

4. A device for preventing sway of a suspended load for a trolley carriage equipped with a hoisting motor for hoisting a rope having one end to which a bucket is attached and a driving motor, the device comprising: a speed pattern creation circuit (11) for creating a speed command, a speed control device (14) for outputting a torque command based on the speed command, a torque command filter (16) for outputting a torque command by a first-order lag circuit by inputting the torque command, a load torque observer (4) for estimating and outputting a load torque on the trolley carriage by inputting the torque command which is an output of the speed control device (14), the device being configured to output a value obtained by adding a load torque estimation signal which is an output of the load torque observer (4) to an output of the torque command filter (16), characterized in that the device is equipped with a high-pass filter (32) for outputting a signal $T_{RFL}$HPF obtained by eliminating a fixed or low frequency component corresponding to frictional resistance from the load torque estimation signal, and configured to input a value obtained by subtracting a damping compensation signal created by multiplying a damping compensation gain $G_{DP}$ determined by each region of a speed pattern of the speed command created by the speed pattern creation circuit (11) by an output signal $T_{RFL}$HPF from the high-pass filter (32) from a speed command $N_{RF0}$ created by the speed pattern creation circuit (11).

* * * * *